United States Patent
Chen et al.

(10) Patent No.: US 8,971,030 B2
(45) Date of Patent: Mar. 3, 2015

(54) STANDABLE ELECTRONIC DEVICE

(75) Inventors: Chien-Wei Chen, Taipei Hsien (TW);
Cheng-Shing Liu, Taipei Hsien (TW);
Ching-Fu Hsu, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 271 days.

(21) Appl. No.: 13/554,102

(22) Filed: Jul. 20, 2012

(65) Prior Publication Data

US 2013/0107437 A1 May 2, 2013

(30) Foreign Application Priority Data

Oct. 31, 2011 (TW) .............................. 100139677 A

(51) Int. Cl.
*H05K 5/00* (2006.01)
*H05K 7/00* (2006.01)
*G06F 1/16* (2006.01)
*H04M 1/02* (2006.01)
*H04M 1/04* (2006.01)

(52) U.S. Cl.
CPC .............. *G06F 1/166* (2013.01); *H04M 1/0214* (2013.01); *H04M 1/04* (2013.01); *G06F 1/1616* (2013.01); *G06F 1/1624* (2013.01); *G06F 1/1626* (2013.01); *G06F 1/1637* (2013.01); *G06F 1/1669* (2013.01); *G06F 1/1679* (2013.01); *G06F 1/1681* (2013.01)
USPC .............. 361/679.27; 361/679.26; 361/679.55

(58) Field of Classification Search
USPC .............. 361/679.26, 679.27, 679.55, 679.56
See application file for complete search history.

(56) References Cited

U.S. PATENT DOCUMENTS

| | | | | |
|---|---|---|---|---|
| 7,724,511 B2 * | 5/2010 | Jacobs | ..................... | 361/679.27 |
| 7,817,408 B2 * | 10/2010 | Chiang et al. | ............ | 361/679.07 |
| 7,848,111 B2 | 12/2010 | Tsai et al. | | |
| 8,004,834 B2 * | 8/2011 | Shih et al. | ............... | 361/679.55 |
| 8,264,828 B2 * | 9/2012 | Chang et al. | ............ | 361/679.28 |
| 8,390,995 B2 * | 3/2013 | Wang et al. | ............. | 361/679.21 |
| 8,390,997 B1 * | 3/2013 | Dominy et al. | .......... | 361/679.27 |
| 8,520,377 B2 * | 8/2013 | Senatori | ................... | 361/679.27 |
| 2005/0206615 A1 * | 9/2005 | Tanimoto et al. | ............ | 345/156 |
| 2008/0271288 A1 * | 11/2008 | Senatori | ......................... | 16/221 |
| 2011/0022892 A1 | 1/2011 | Zhang et al. | | |

FOREIGN PATENT DOCUMENTS

| | | |
|---|---|---|
| CN | 1863292 | 11/2006 |
| CN | 101162248 | 4/2008 |
| CN | 101675403 TW | 3/2010 |
| CN | 101963930 | 2/2011 |
| TW | I347821 | 12/2009 |
| TW | M408226 | 7/2011 |
| TW | M408226 U1 | 7/2011 |

* cited by examiner

*Primary Examiner* — Anthony Haughton
(74) *Attorney, Agent, or Firm* — Muncy, Geissler, Olds & Lowe, P.C.

(57) ABSTRACT

The disclosure relates to a standable electronic device, which comprises an electronic device body, a supporting member, and a base. The supporting member is disposed on the electronic device body. The supporting member is disposed on the base. A spreading angle is produced between the electronic device body and the supporting member, so that the bottom of the electronic device rests against the base and hence making the electronic device stand on a surface of object. According to the disclosure, no extra supporting frame is required for making the electronic device stand on a surface of object. Thereby, the portability and utility can be enhanced effectively.

22 Claims, 16 Drawing Sheets

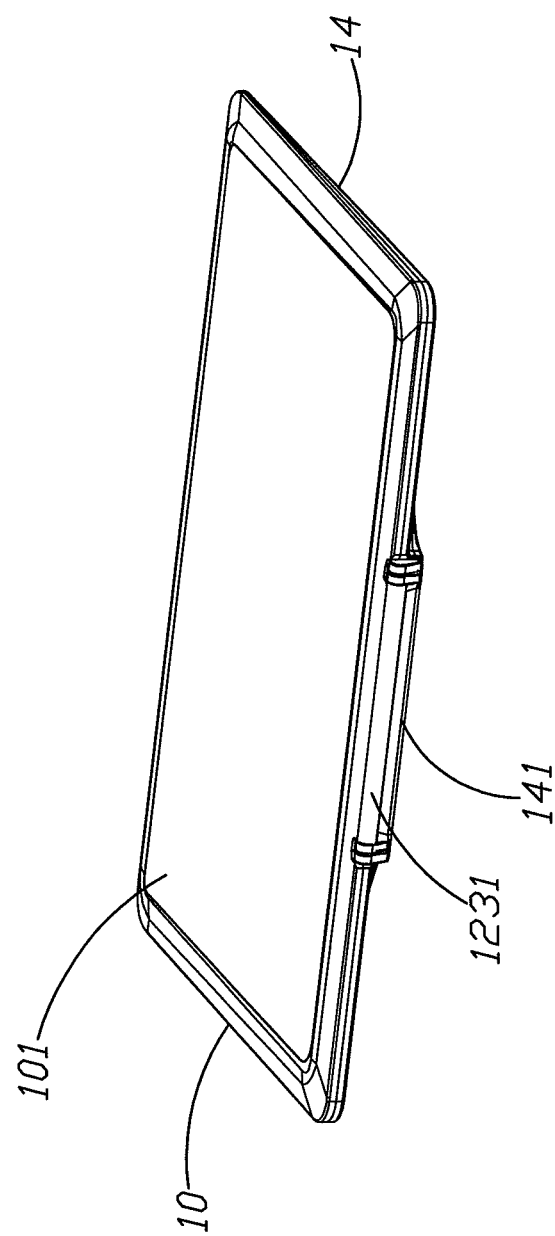

STANDABLE ELECTRONIC DEVICE

FIELD OF THE INVENTION

The disclosure relates generally to an electronic device, and particularly to a standable electronic device.

BACKGROUND OF THE INVENTION

Computers are developed from earlier mainframe computers to personal computers, notebook computers, and touch-controlled portable electronic devices such as smart phones, tablet computers. By means of the touch panel technology, users can select the target item on the computer display intuitively. Besides, two or more fingers can slide away from or towards each other for enlarging or shrinking images or texts on displays. The direct operation on the display makes the distance between the user and the display closer. For traditional computers, a keyboard is placed and operated between the user and the display and hence less convenient than portable electronic devices, which use touch panels as the operational interface. Moreover, portable electronic devices adopt a simple flat structure. Users can thereby touch and operate on the display at will.

Because of their simple structures and delicate looks, portable electronic devices always can attract users' fondness. Nonetheless, their appearances are vulnerable to scratches or dirt and hence affecting their looks. Accordingly, protecting cases of various materials for portable electronic devices are provided in the market. These cases usually cover the back of electronic devices and the portion corresponding to the display is hollowed out for operations. Thereby, the appearance of the machine body can be protected. In addition, many portable electronic devices, such as tablet computers with larger size, adopt simple flat structures without extra supporting devices. Users need to support the weight of computer using one hand and operate using the other. When the computer is put on a desk or on laps, for acquiring a preferable viewing angle, users also need to support it using their palms for keeping it standing. These will bring inconvenience to the users. Long-term usage is likely to result in fatigue on the users' arms. Besides, portable electronic devices are usually used on hands. In addition to operations, both hands also need to hold the portable electronic devices for avoiding dropping them. Thereby, after long-term holding, both hands will feel numb. Moreover, for having beautiful appearance, this kind of portable electronic devices are usually designed sleekly and roundly, which is even unfavorable for holding by hands.

Furthermore, a general tablet computer is designed for handheld usage. The dimensions of a common 10-inch tablet computer are 18 cm×24 cm with weight greater than 500 g. A user uses a hand to hold one side of the tablet computer and the other hand to operate the touch display thereof. The hand holding the computer needs to support the weight of the computer. In addition, because the hand does not hold at the center of gravity of the computer, it also has to support the lever force produced by the gravity. Thereby, the load on the hand is increased, which results in fatigue and burden on the hand. The affordable support time is also reduced.

Nevertheless, if an electronic device according to prior art needs to stand on the surface of object, a supporting frame is required for supporting the electronic device according to the prior art placed thereon. Thereby, the supporting frame has to be carried while carrying the electronic device. If not, the electronic device according to the prior art cannot stand on the surface of object, and thus lowering portability and convenience.

For solving the problems described above, the disclosure provides a standable electronic device, which can stand on the surface of object independently without using another supporting frame. Thereby, portability and convenience can be enhanced.

SUMMARY

An objective of the disclosure is to provide a standable electronic device, which can stand on the surface of object independently without using another supporting frame. Thereby, portability and convenience can be enhanced.

For achieving the objective described above, the standable electronic device according to the disclosure comprises an electronic device body, a supporting member, and a base. The electronic device body has a first surface and a second surface; the first surface has a display region. The supporting member has a first end and a second end; the first end is disposed on the second surface. The base is used for disposing the supporting member. The second end pivots on the first end and moves away from the second surface. Thereby, the bottom of the electronic device body rests against the base and thus standing on the surface of object.

BRIEF DESCRIPTION OF THE DRAWINGS

FIGS. 6A to 6E show usage views according to the second embodiment of the disclosure;

DETAILED DESCRIPTION

In order to make the structure and characteristics as well as the effectiveness of the disclosure to be further understood and recognized, the detailed description of the disclosure is provided as follows along with embodiments and accompanying figures.

If an electronic device according to prior art needs to stand on the surface of object, a supporting frame is required for supporting the electronic device according to the prior art placed thereon. Thereby, the supporting frame has to be carried while carrying the electronic device. If not, the electronic device according to the prior art cannot stand on the surface of object. The disclosure improves the problem described above by providing a standable electronic device, which has a supporting structure therein. Accordingly, no extra supporting frame has to be carried and used for making the electronic device stand on the surface of object.

Figure 1:
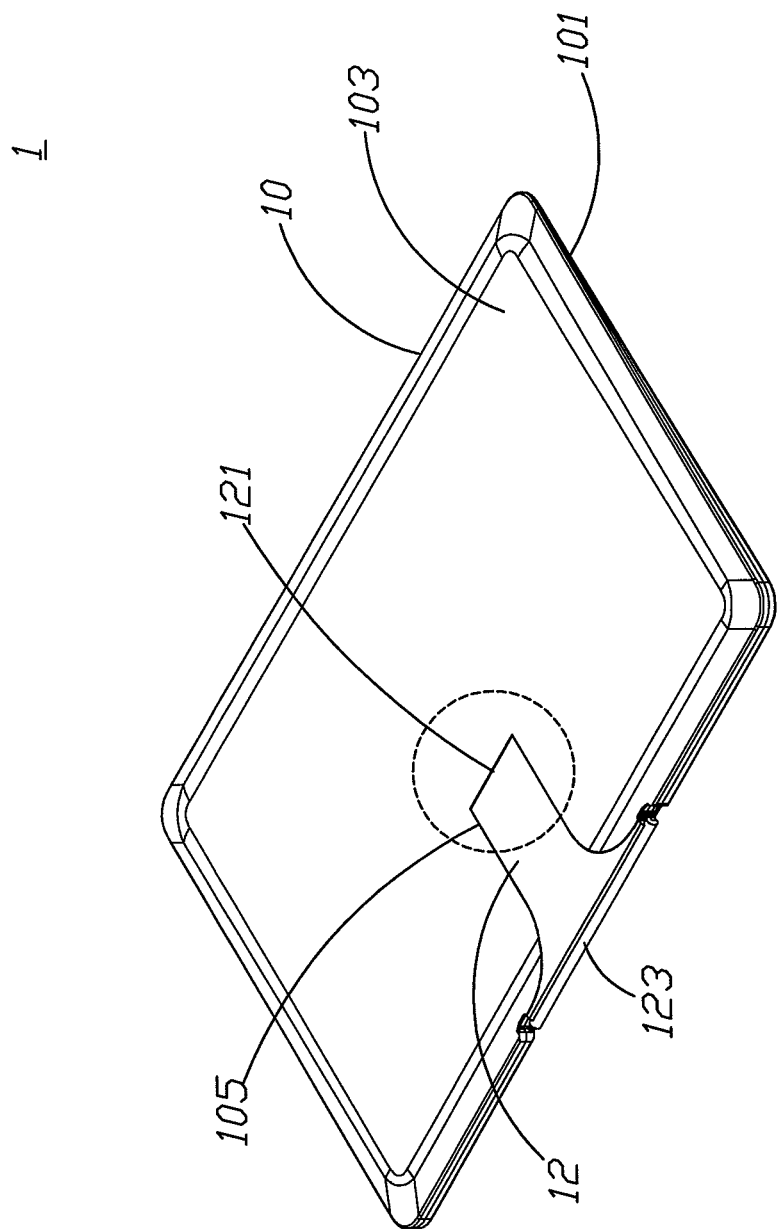
FIG. 1 shows a three-dimensional view according to a first embodiment of the disclosure.
Figure 2:
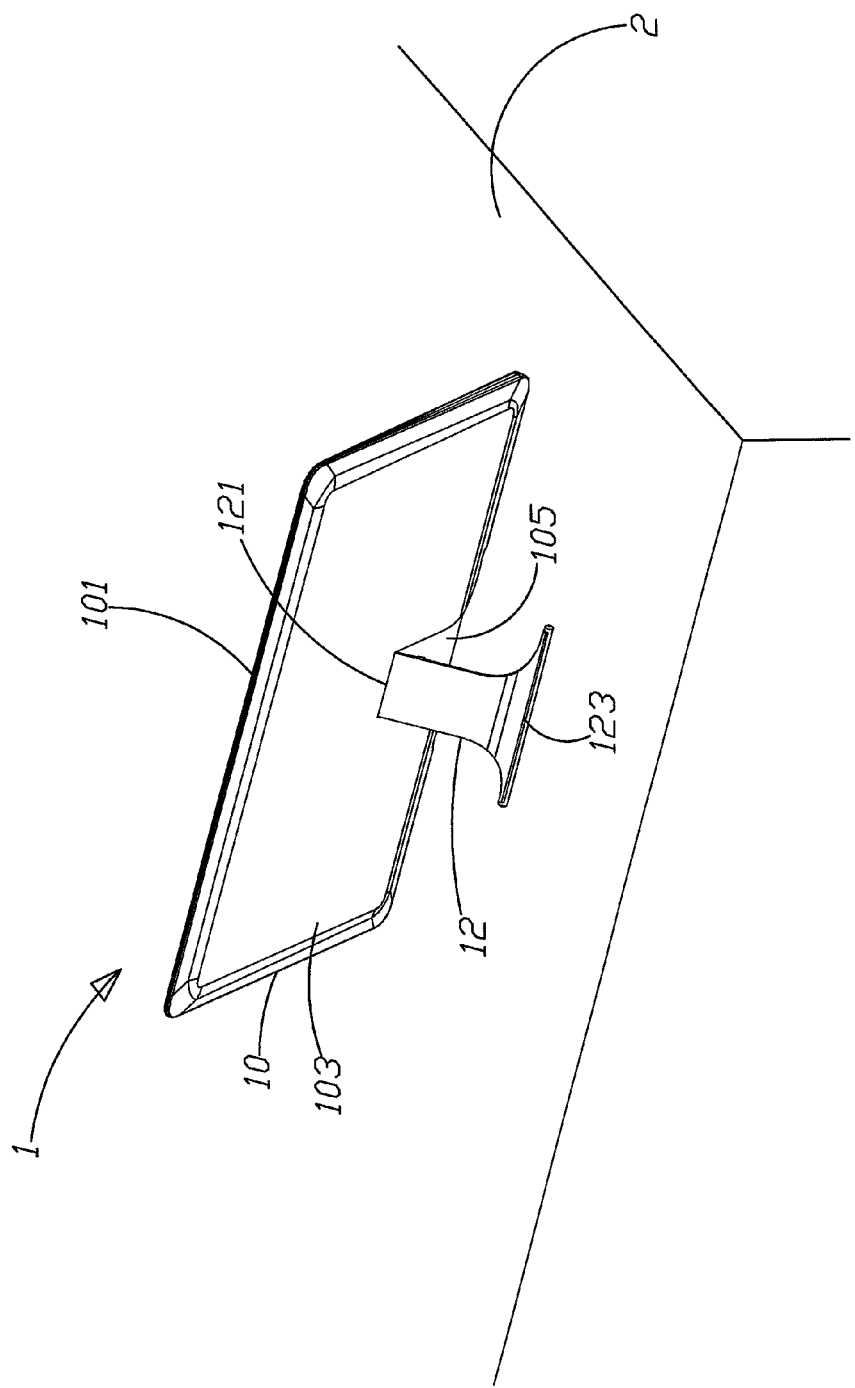
FIG. 2 shows a usage view according to the first embodiment of the disclosure.

FIG. 1 and FIG. 2 show a three-dimensional view and a usage view according to a first embodiment of the disclosure. As shown in the figure, the present embodiment provides a standable electronic device 1, which can be a tablet computer, a smart phone, a personal digital assistant, automobile guiding device, or other electronic devices with display panels. According to the present embodiment, the electronic device 1 is a tablet computer. The electronic device 1 comprises an electronic device body 10 and a supporting member 12. The electronic device body 10 has a first surface 101 and a second surface 103. A display region is disposed on the first surface 101. The supporting member 12 has a first end 121 and a second end 123. The first end 121 is disposed on the second surface 103 of the electronic device body 10. The second end 123 is located on the second surface 103 of the electronic device body 10.

While using the electronic device 1, a user pulls the second end 123 of the supporting member 12. The second end 123 pivots on the first end 121 and moves away from the second surface 103. When the supporting member 12 moves away from the second surface 102 of the electronic device body 10, a spreading angle is produced between the supporting member 12 and the second surface 103. Then the user can put the electronic device 1 on a surface of object 2. The bottom of the electronic device body 10 and the second end 123 of the supporting member 12 are placed on the surface of object 2. The spreading angle between the electronic device body 10 and the supporting member 12 keeps the electronic device 1 balanced and standing on the surface of object 2.

Figure 3:
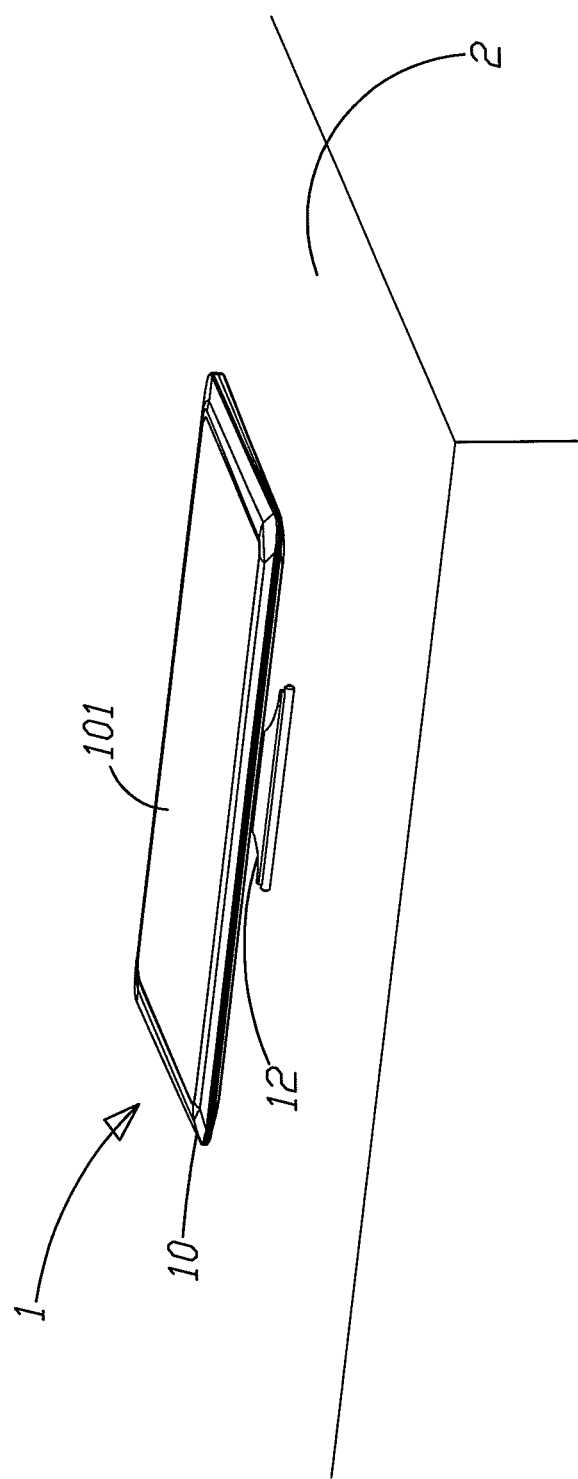
FIG. 3 shows a usage view according to the first embodiment of the disclosure.

FIG. 2 is a mode of the first embodiment. The spreading angle between the electronic device body 10 and the supporting member 12 is an acute angle (less than 90 degrees). Thereby, the angle between the electronic device body 10 and the surface of object 2 is greater. Thus, the user can view the display region of the electronic device 1 more closely. FIG. 3 shows another mode of the first embodiment. The spreading angle between the electronic device body 10 and the supporting member 12 is an obtuse angle (greater than 90 degrees). Thereby, the angle between the electronic device body 10 and the surface of object 2 is smaller. Thus, the user can view the display region of the electronic device 1 more distantly. Accordingly, the user can adjust the spreading angle between the electronic device body 10 and the supporting member 12 according to his own requirements, and hence adjusting the distance for viewing the display region of the electronic device 1.

The present embodiment discloses the standable electronic device 1, which has the supporting member 12. The electronic device 1 can stand on the surface of object 2 by means of the electronic device body 10 and the supporting member 12. The electronic device according to the prior art need to dispose an extra supporting frame for standing on the surface of object. On the contrary, the supporting member 12 according to the present embodiment is disposed directly on the electronic device body 10. It is not necessary to carry and use an extra supporting frame. Thereby, the portability and convenience of the electronic device 1 according to the present embodiment is superior to the one according to the prior art.

Refer again to FIG. 1 and FIG. 2. A recess 105 is further disposed on the second surface 103 of the electronic device 1. The first end 121 of the supporting member 12 is disposed on one side of the recess 105. The supporting member 12 is held in the recess 105. The surface of the supporting member 12 and the second surface 103 of the electronic device body 10 are on the plane. Alternatively, the surface of the supporting member 12 is lower than the second surface of the electronic device body 10. Thereby, the supporting member 12 will not protrude the second surface 103 of the electronic device body 10. The appearance of the electronic device 1 will not be affected accordingly.

Figure 4:
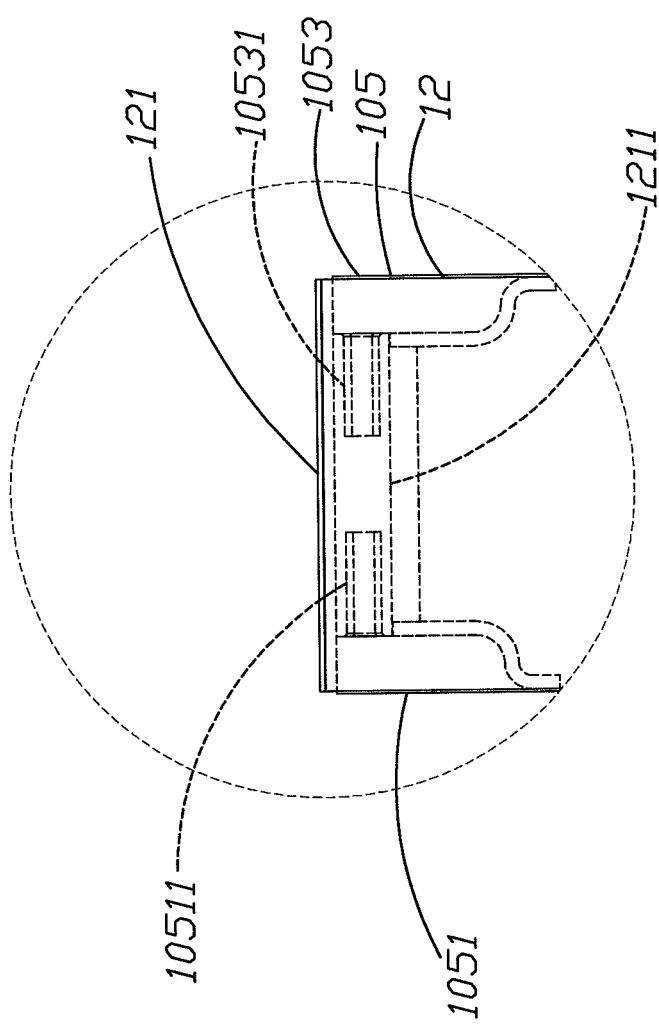
FIG. 4 shows a partial enlarged view according to the first embodiment of the disclosure.

FIG. 4 shows a partial enlarged view according to the first embodiment of the disclosure. As shown in the figure, how the first end 121 of the supporting member 12 is disposed in the recess 105 of the electronic device body 10 is disclosed in the cross-sectional view. The first end 121 has a first pivot shaft 1211. The recess 105 has a first sidewall 1051 and a second sidewall 1053 corresponding to the first sidewall 1051. The first and the second sidewalls 1051, 1053 have a positioning member 10511, 10531, respectively. The both ends of the first pivot shaft 1211 of the first end 121 are disposed pivotally at the positioning member 10511 of the first sidewall 1051 and the positioning member 10531 of the second sidewall 1053, respectively. Then the second end 123 of the supporting member 12 pivots on the first pivot shaft 1211 of the first end 121 to produce a spreading angle between the second surface 103 of the electronic device body 10 and the supporting member 12. Thereby, the electronic device 1 can stand on the surface of object 2.

Figure 5:
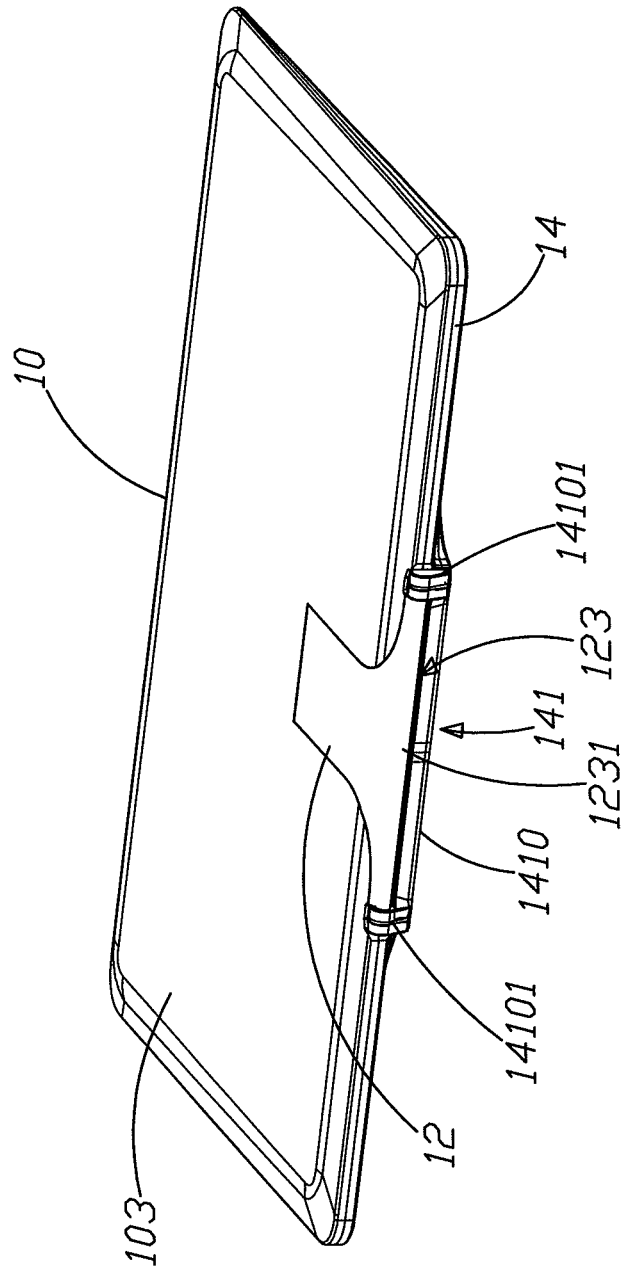
FIG. 5 shows a three-dimensional view according to a second embodiment of the disclosure.
Figure 6A:
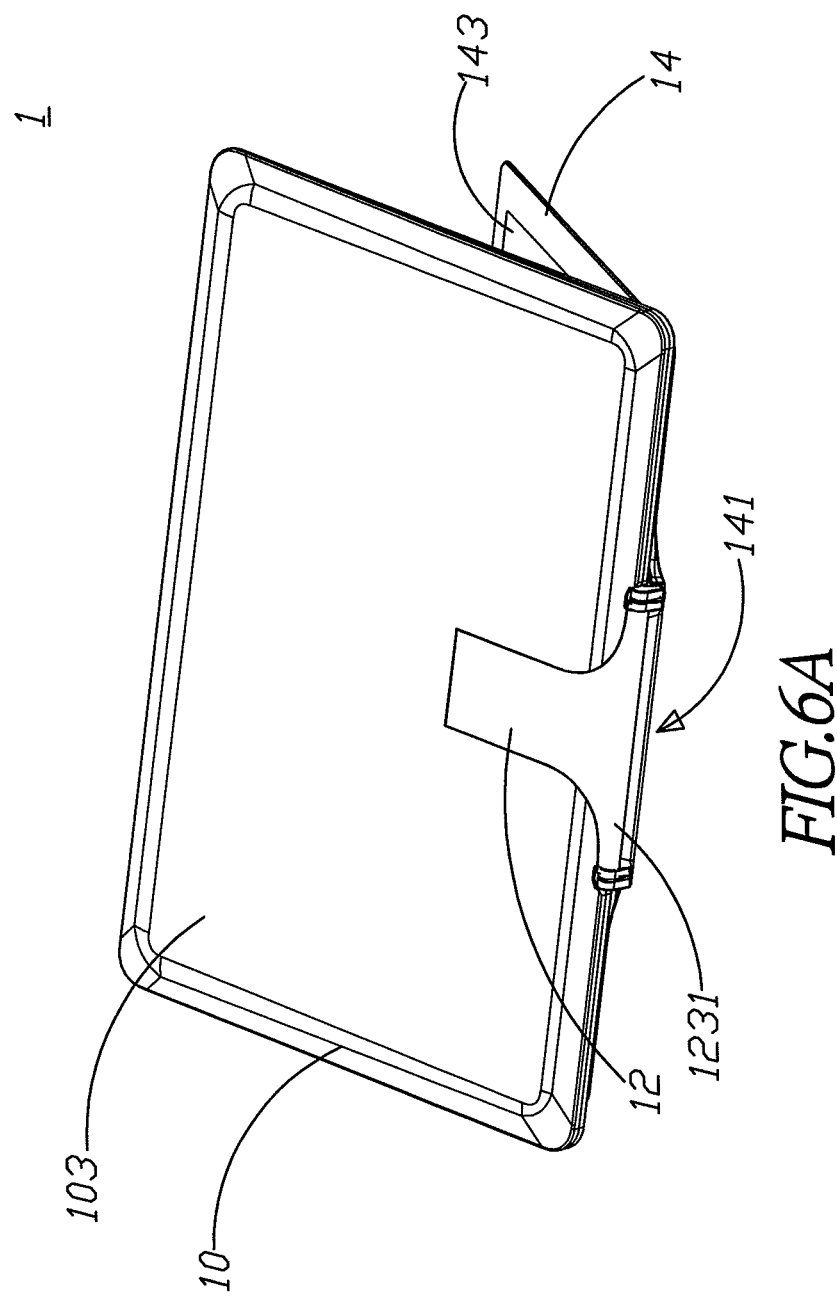
Figure 6B:
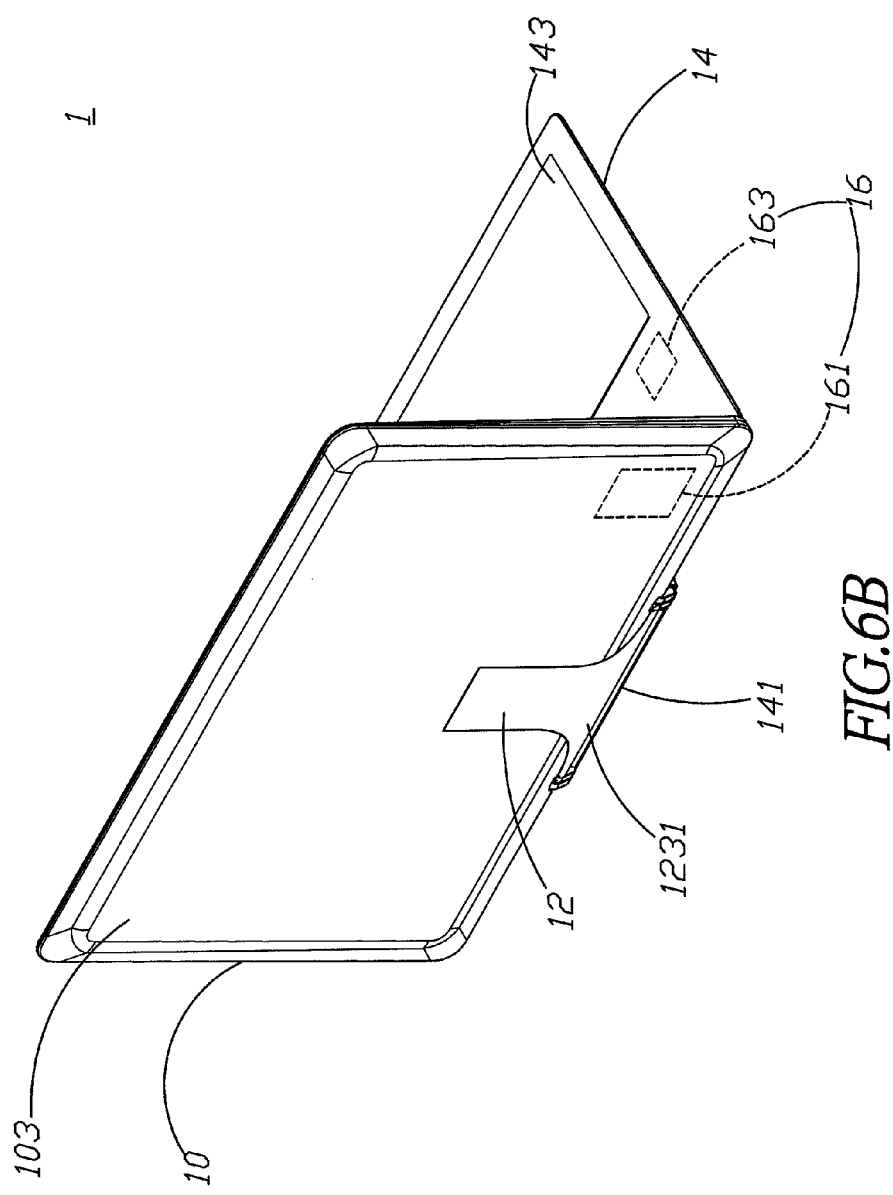
Figure 6C:
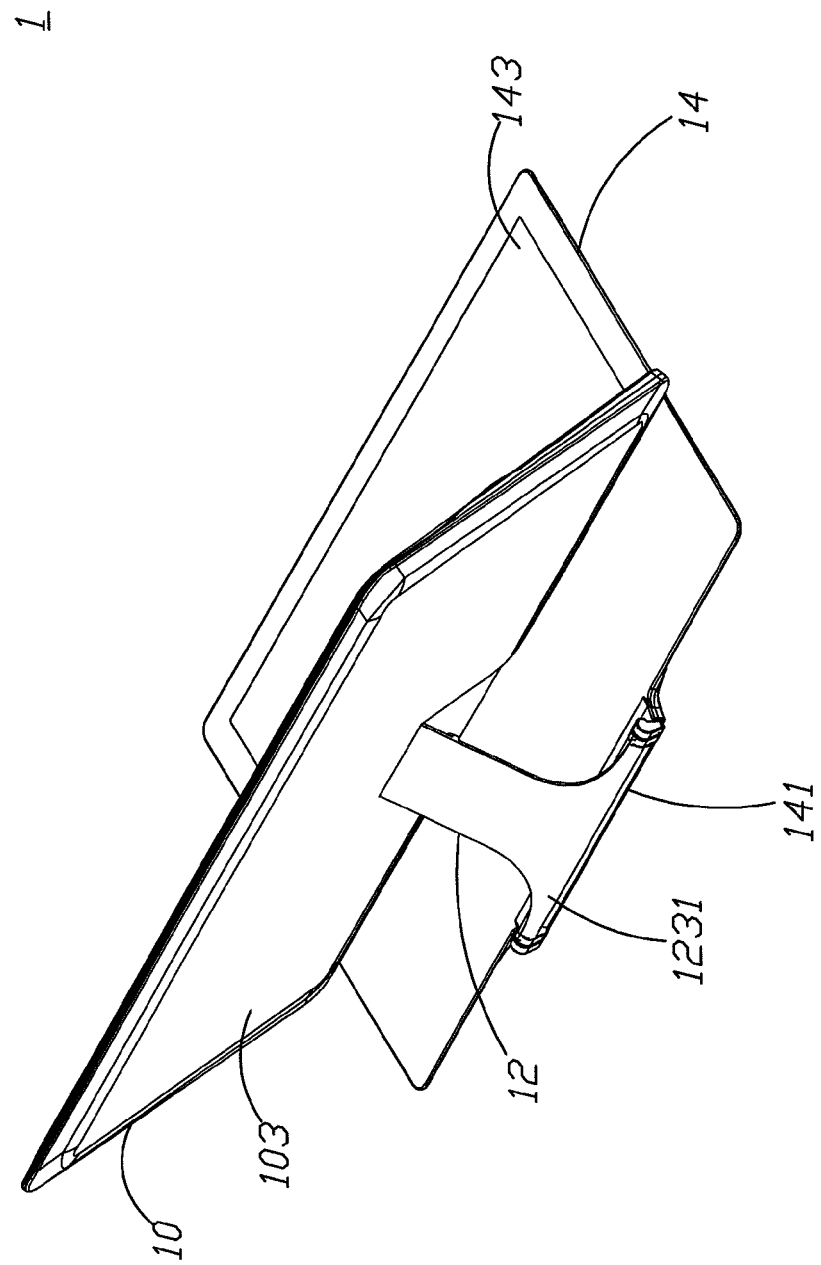
Figure 6D:
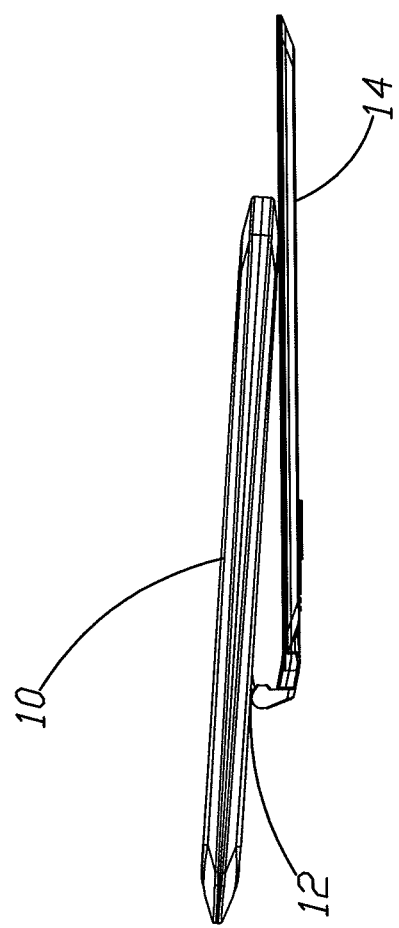

FIG. 5 shows a three-dimensional view according to a second embodiment of the disclosure. As shown in the figure, the difference between the present embodiment and the first embodiment is that the electronic device 1 according to the present embodiment further comprises a base 14, which has a locking mechanism 141. The second end 123 of the supporting member 12 has a second pivot shaft 1231. The locking mechanism 141 has a pivot member 1410 having a pivot part 14101 at its both ends, respectively. The both ends of the second pivot shaft 1231 are disposed pivotally at the two pivot parts 14101, respectively. When the electronic device 1 disclosed on FIG. 5 is not in use, the first surface (not shown in the figure) of the electronic device body 10 can contact closely with the base 14. The base 14 can thereby protect the display region of the first surface 101 from scratches. The electronic device according to the prior art may have scratches caused by impacts during the carrying process. Thereby, an extra protection case needs to be carried and the electronic device according to the prior art should be installed therein. On the contrary, it is not necessary to carry and use a protection case for using the electronic device 1 according to the present embodiment. By using the base 14, the display region of the electronic device body 10 can be protected.

FIGS. 6A to 6E show usage views according to the second embodiment of the disclosure. As shown in the figures, while using the electronic device 1, the user pulls the top of the electronic device body 10. The second pivot shaft 1231 of the supporting member 12 acts as the pivot to make the electronic device body 10 move away from the base 14. Next, when the angle between the electronic device body 10 and the base 14 is 90 degrees, the user pushes the top of the electronic device body 10. The first end 121 of the supporting member 12 acts as the pivot for the electronic device body 10. There appears a spreading angle between the electronic device body 10 and the supporting member 12. The spreading angle can be adjusted according to the requirements of the user. Finally, the bottom of the electronic device body 10 can rest against the base 14. Thereby, the user can change the angle of the electronic device body by himself. The first surface 101 of the electronic device body 10 can contact closely with the base 14 for facilitating portability. Alternatively, the first surface 101 of the electronic device body 10 can face outwards so that the user can use the electronic device with convenience.

Normally, while using the electronic device according to the prior art, the user will also use some computer peripheral devices and integrate them with the electronic device according to the prior art, and hence being inconvenience for carrying. For improving the problem described above, the base 14 according to the present embodiment can further integrate with at least a computer peripheral device 143, which means that the base 14 include the computer peripheral device 143. The computer peripheral device 143 can be an input interface, such as a keyboard, touch pad, or handwriting pad, an output device, such as a playing device (loudspeaker), a CD/DVD player, a CD/DVD burner, a storage device, or an expansion battery. The computer peripheral device 143 uses a transmission module 16 to transmit signal with the electronic device body 10. The transmission module 16 can be a wired or a wireless transmission module.

Refer again to FIG. 6B. The transmission module 16 according to the present embodiment adopts a wireless transmission module. A first wireless transmission device 161 is disposed in the electronic device body 10; a second wireless transmission device 163 is disposed in the base 14. The second wireless transmission device 163 is connected electrically to the computer peripheral device 143. Then the first and second wireless transmission devices 161, 163 transmit and receive signals, respectively, so that the electronic device body 10 and the computer peripheral device 143 can transmit signal to each other. The transmission module 16 can, of course, adopt a wired transmission module, which uses a transmission line to connect a connection port of the electronic device body 10 with a connection port of the computer peripheral device 143 so that the electronic device body 10 and the computer peripheral device 143 can transmit signal to each other. The details will not be described further.

Figure 7A:
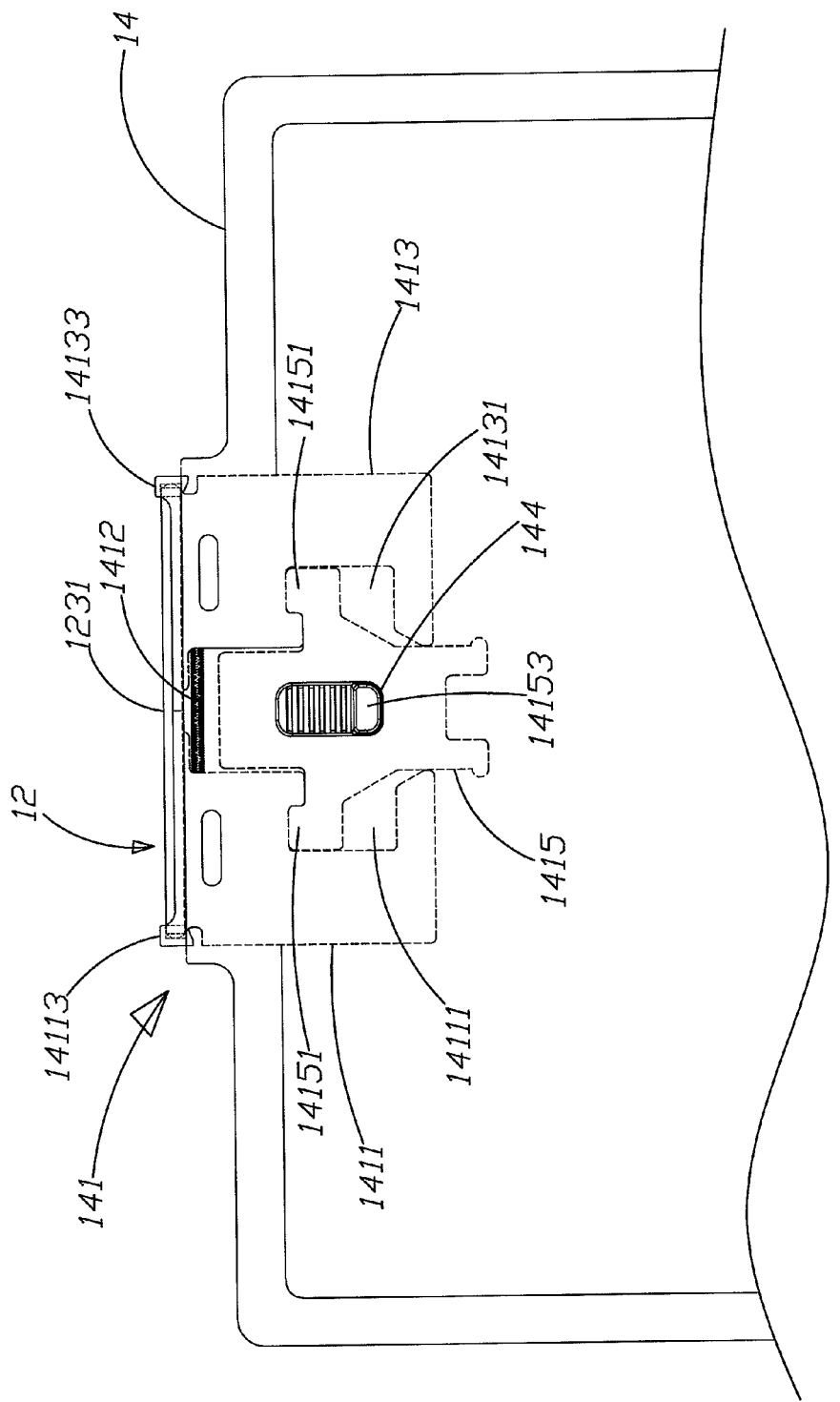
FIGS. 7A and 7B show usage views according to a third embodiment of the disclosure.
Figure 7B:
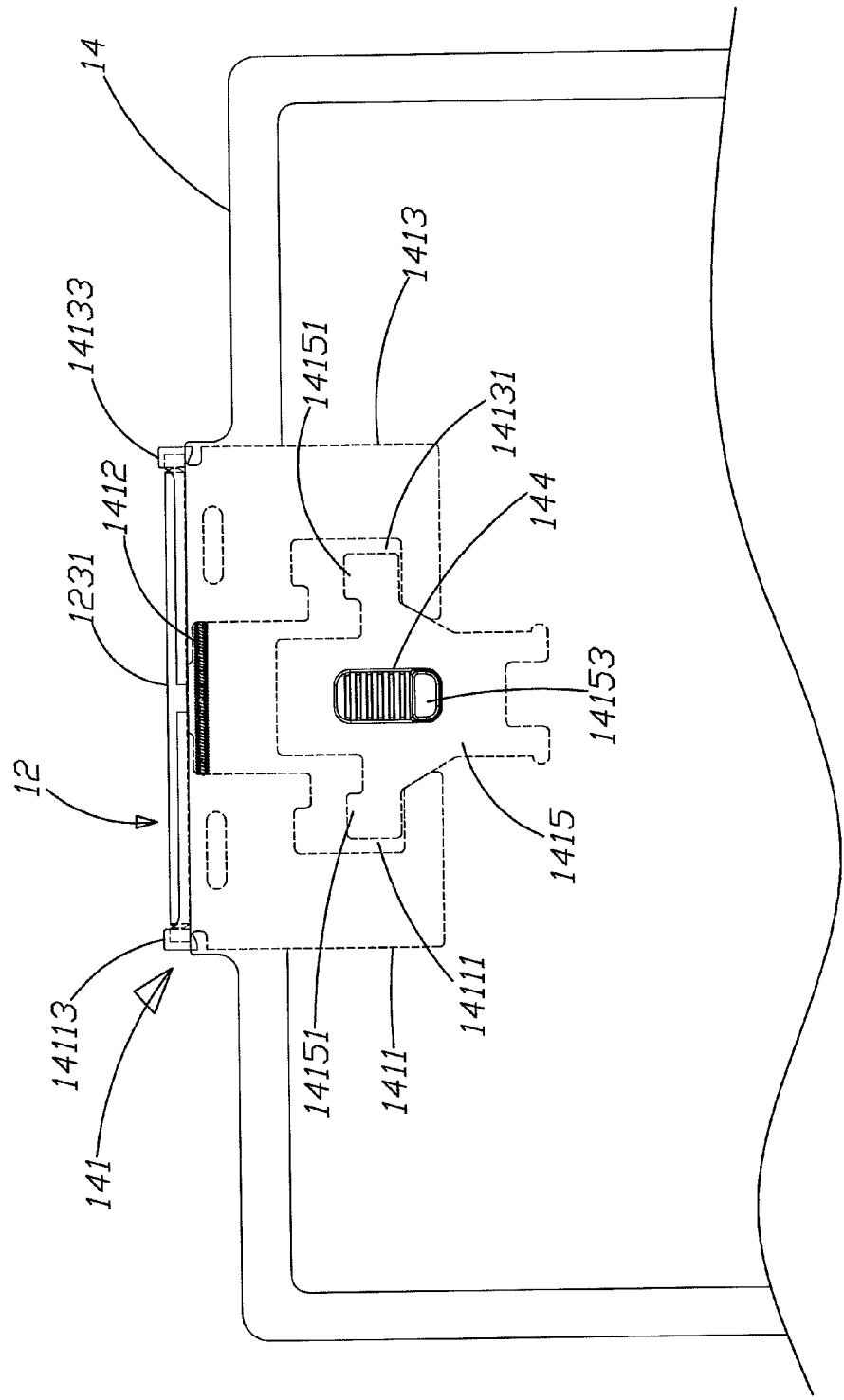

FIGS. 7A and 7B show usage views according to a third embodiment of the disclosure. As shown in the figures, the difference between the present embodiment and the second embodiment is that the locking mechanism 141 is not only used for disposing pivotally the second pivot shaft 1231 of the supporting member 12 but also for releasing the second pivot shaft 1231 and separating the electronic device body 10 and the base 14. When the electronic device body 10 and the base 14 are separated, the electronic device body 10 can stand on the surface of object independently by using the supporting member 12. This has been disclosed in the first embodiment, and will not be described in details.

The present embodiment mainly discloses the structure of the locking mechanism 141, which comprises a first pivot member 1411, a second pivot member 1413, and a lock member 1415. The first pivot member 1411, the second pivot member 1413, and the lock member 1415 are embedded in the base 14. The first pivot member 1411 includes a first recess 14111 and a first pivot part 14113; the second pivot member 1413 includes a second recess 14131 and a second pivot part 14133. The first recess 14111 and the first pivot part 14113 are disposed symmetrically to the second recess 14131 and the second pivot part 14133. The lock member 1415 includes two fasteners 14151 located symmetrically on both sides of the lock member 1415. The lock member 1415 is disposed and slides between the first pivot member 1411 and the second pivot member 1413.

When the lock member 1415 slides upwards, the two fasteners 14151 are wedged in the first and second recesses 14111, 14131, respectively. The first pivot part 14113 and the second pivot part 14133 displace inwards to make both ends of the second pivot shaft 1231 connected pivotally to the first and second pivot parts 14113, 14133 for fixing the second pivot shaft 1231 of the supporting member 12 in the locking mechanism 141. On the other hand, when the lock member 1415 slides downwards, the two fasteners 14151 escape from the first and second recesses 14111, 14131, respectively. The first pivot part 14113 and the second pivot part 14133 displace outwards to make both ends of the second pivot shaft 1231 escape from the first and second pivot parts 14113, 14133 for disassemble the electronic device body 10 from the base 14.

The first and second pivot parts 14113, 14133 are recesses, respectively. The both ends of the second pivot shaft 1231 connected pivotally to the first and second pivot parts 14113, 14133 are protruding members, respectively. Thereby, the both ends of the second pivot shaft 1231 can connect to the first and second pivot parts 14113, 14133, respectively. Alternatively, the first and second pivot parts 14113, 14133 can be protruding members. The both ends of the second pivot shaft 1231 connected pivotally to the first and second pivot parts 14113, 14133 have recesses, respectively. Thereby, the purpose of connecting pivotally the both ends of the second pivot shaft 1231 to the first and second pivot parts 14113, 14133 can also be achieved.

The lock member 1415 has an adjusting part 14153. The base 14 has a groove 144. The adjusting part 14153 is disposed in the groove 144. The user can control the adjusting part 14153 to slide along the groove 144 from outside of the base 14, and thus driving the lock member 1415 to slide between the first and second pivot members 1411, 1413 for fixing or releasing the second pivot shaft 1231 of the supporting member 12.

An elastic body 1412 is further disposed between the first and second pivot members 1411, 1413. The both ends of the elastic body 1412 are connected to the first and second pivot members 1411, 1413. If the elastic body 1412 is an elongate spring, when the first and second pivot members 1411, 1413 experience the contractive force of the elastic body 1412, the first and second pivot members 1411, 1413 displace inwards for fixing the second pivot shaft 1231. When the user moves the adjusting part 14153 downwards, the lock member 1415 moves downwards and pushes the first and second pivot members 1411, 1413 sideward, which makes the supporting member 12 escape from the locking mechanism 141. If the elastic body 1412 is a compressed spring, when the first and second pivot members 1411, 1413 fix the second pivot shaft 1231, the elastic body is compressed. When the lock member 1415 releases the first and second pivot members 1411, 1413, the first and second pivot members 1411, 1413 spring sideward. Then the lock member 1415 moves downwards and fixes the first and second pivot members 1411, 1413 on both sides for making the both ends of the second pivot shaft 1231 to escape from the first and second pivot parts 14113, 14133, respectively and thus making the supporting member 12 escape from the locking mechanism 141. Accordingly, the disposal of the elastic body 1412 can improve convenience in operations.

Figure 8A:
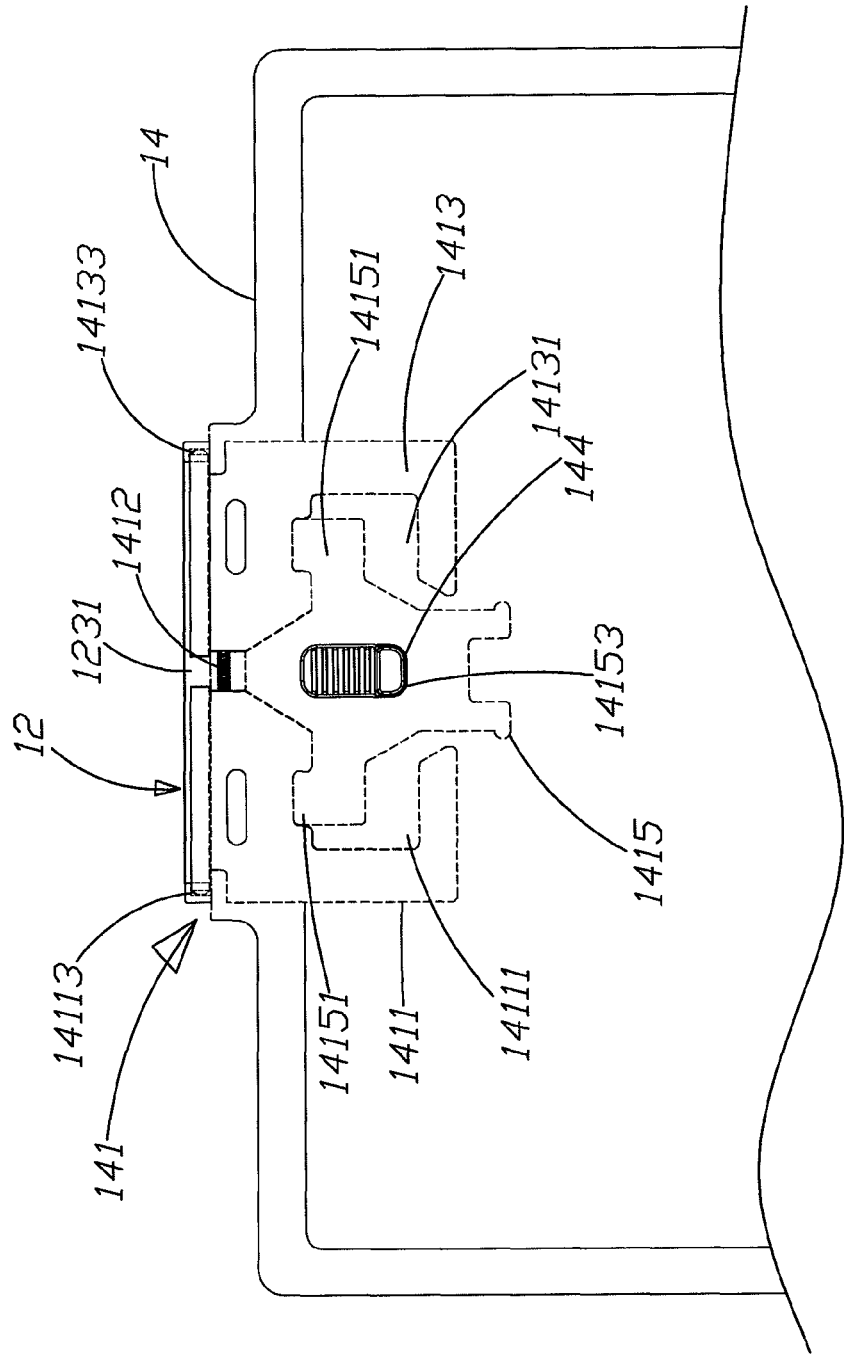
FIGS. 8A and 8B show usage views according to a fourth embodiment of the disclosure.
Figure 8B:
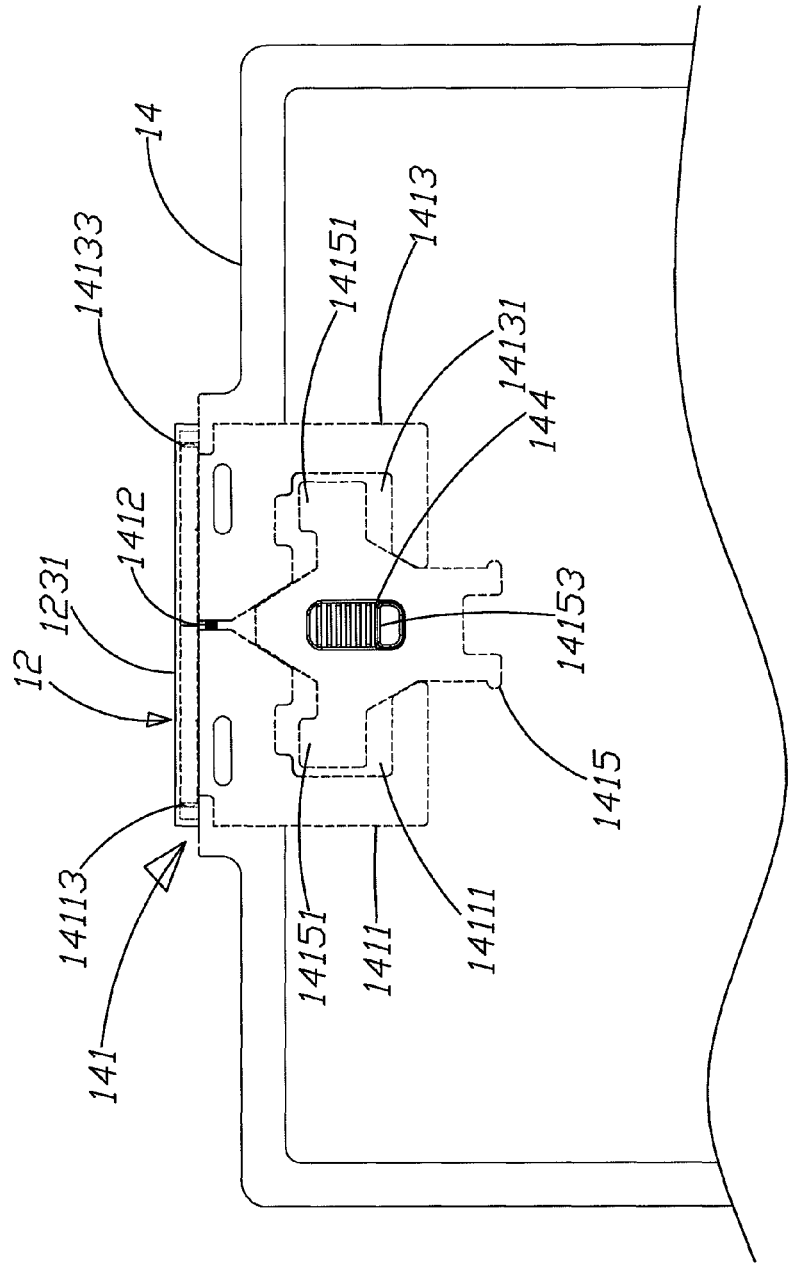

FIGS. 8A and 8B show usage views according to a fourth embodiment of the disclosure. As shown in the figures, the present embodiment provides another locking mechanism 141. The difference between the locking mechanism 141 according to the present embodiment and the one in the third embodiment is that the locking mechanism 141 according to the present embodiment makes its two fasteners 14151 wedge in the first and second recesses 14111, 14131 via the upward movement of the lock member 1415 for pushing the first and second pivot members 1411, 1413 sideward. Thereby, the first and second pivot parts 14113, 14133 displace outwards for touching against the both ends of the supporting member 12 and hence making the supporting member 12 to connect pivotally to the locking mechanism 141. When the lock member 1415 moves downwards and makes its two fasteners 14151 escape from the corresponding first and second recesses 14111, 14131, the first and second pivot members 1411, 1413 will displace inwards, which makes the first and second pivot parts 14113, 14133 displace inwards. Accordingly, the supporting member 12 can escape from the locking mechanism 141 and thus separating the electronic device body 10 from the base 14. The elastic body 1412 disposed between the first and second pivot member 1411, 1413 according to the third embodiment can also be applied to the present embodiment. The details will be repeated again.

Figure 9A:
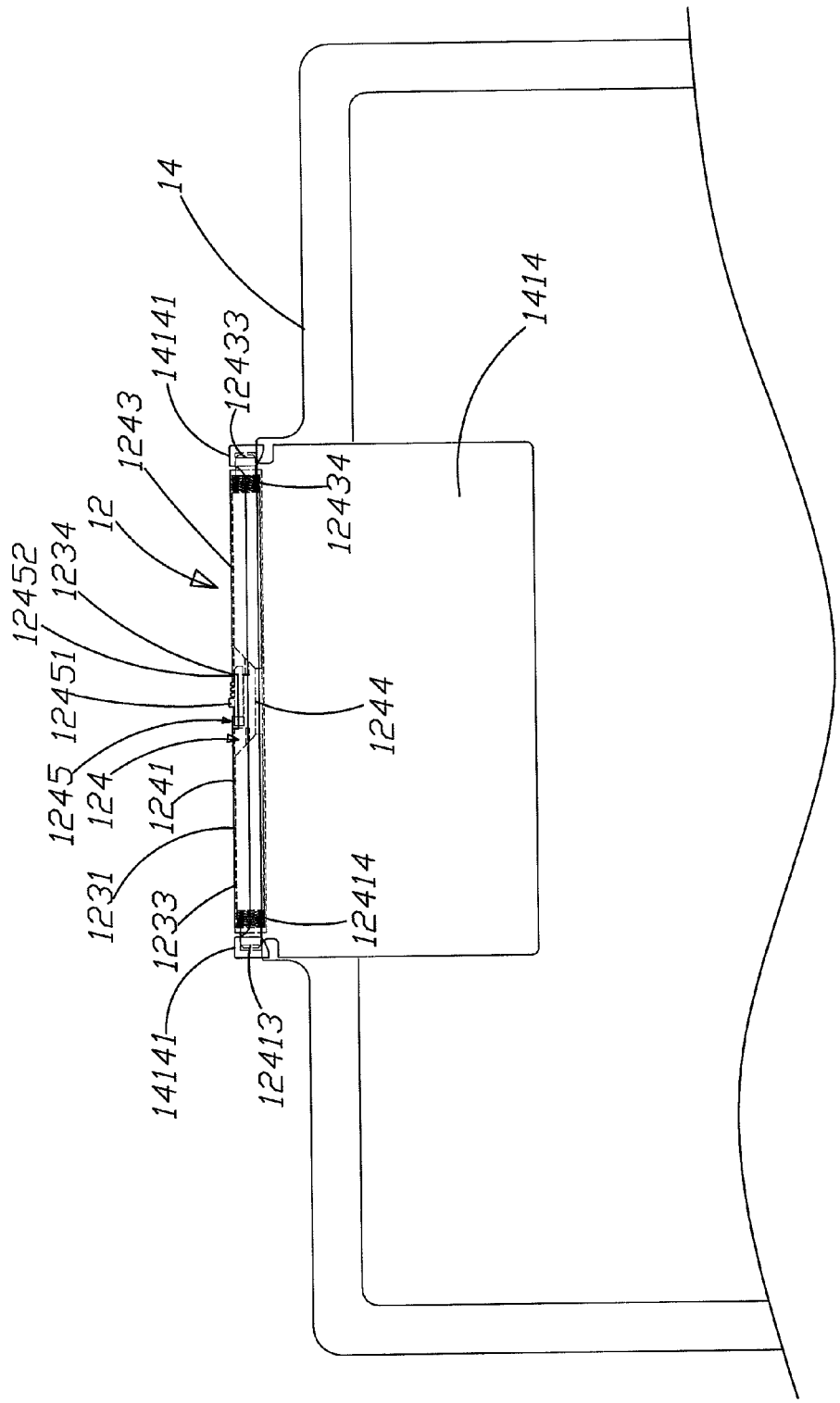
FIGS. 9A and 9B show usage views according to a fifth embodiment of the disclosure.
Figure 9B:
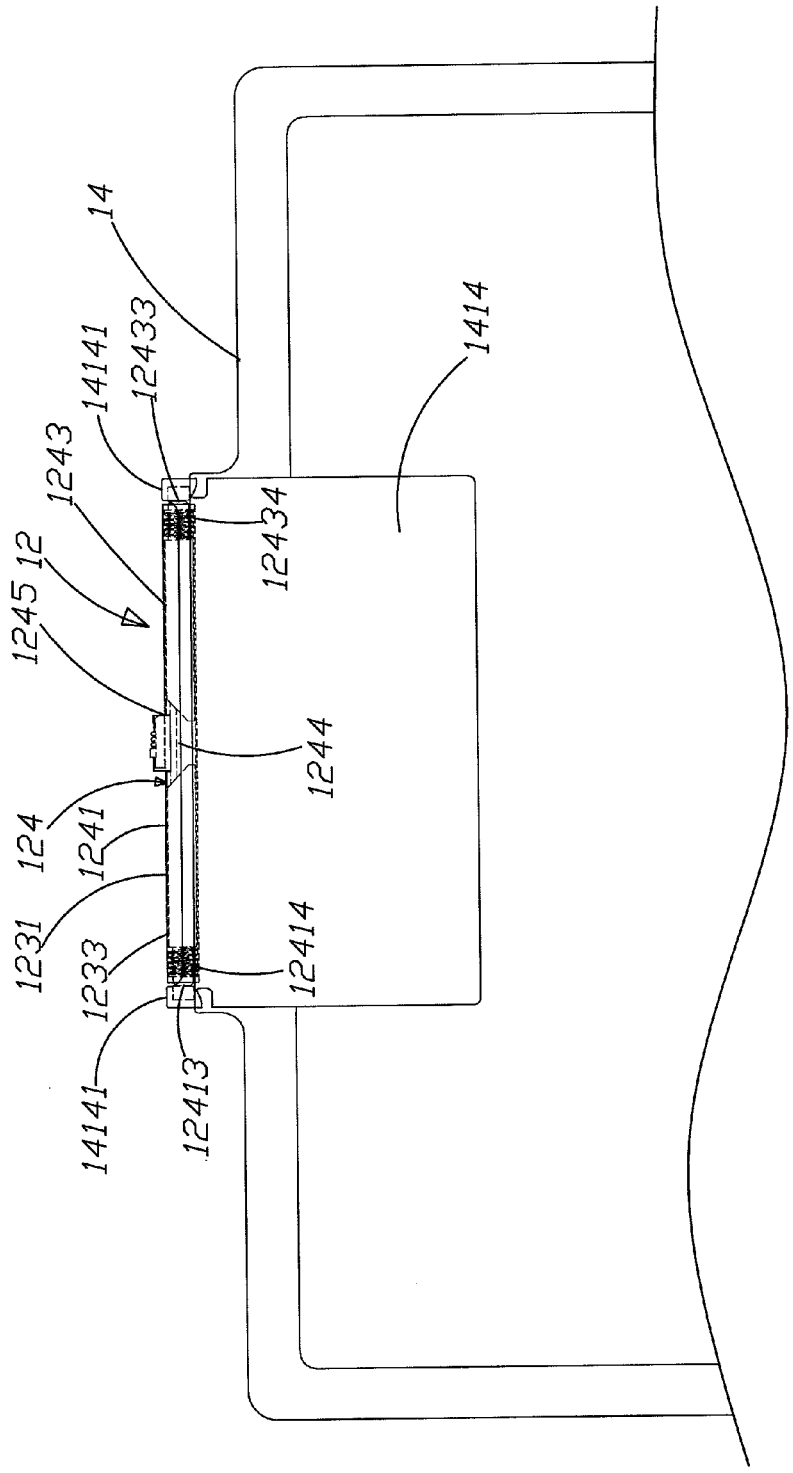

FIGS. 9A and 9B show usage views according to a fifth embodiment of the disclosure. As shown in the figure, the difference between the present embodiment and the fourth embodiment is that the locking mechanism 124 according to the present embodiment is disposed on the second pivot shaft 1231 of the supporting member 12. The locking mechanism 124 comprises a first pivot member 1241, a second pivot member 1243, and a lock member 1244. The second pivot shaft 1231 of the supporting member 12 has a sliding groove 1233 therein. The first pivot member 1241, the second pivot member 1243, and the lock member 1244 are disposed in the sliding groove 1233. The lock member 1244 is disposed between the first and second pivot members 1241, 1243. The first pivot member 1241 has a first pivot part 12413 at one end; the second pivot member 1241 has a first pivot part 12433 at one end. The first and second pivot parts 12413, 12433 are disposed symmetrically. The lock member 1244 has an adjusting part 1245. The second pivot shaft 1231 has an opening 1234 at center. The adjusting part 1245 is located in the opening 1234 and exposed. The base 14 further includes a pivot member 1414 embedded in the base 14. The pivot member 1414 has two pivot parts 14141 connected pivotally to the first and second pivot parts 12413, 12433 for disposing the electronic device body 10 on the base 14.

When the user presses the adjusting part 1245, the lock member 1244 moves downward and presses the first and second pivot members 1241, 1243 on both sides. The first and second pivot parts 12413, 12433 pushes against the two pivot parts 14141 of the base 14, respectively for disposing the electronic device body 10 on the base 14. On the other hand, when the user releases the adjusting part 1245, the lock member 1244 moves upwards and releases the first and second pivot members 1241, 1243 on both sides. The first and second pivot parts 12413, 12433 escape from the two pivot parts 14141 of the base 14, respectively, for separating the electronic device body 10 from the base 14.

The first and second pivot members 1241, 1243 further comprise a first elastic body 12414 and a second elastic body 12434, respectively. The first elastic body 12414 and the second elastic body 12434 are disposed at the first and second pivot parts 12413, 12433, respectively. When the first and second pivot parts 12413, 12433 are against the two pivot parts 14141 of the base 14, the first and second elastic bodies 12414, 12434 are compressed. When the lock member 1245 is released, the counterforce pushes the first and second pivot members 1241, 1243 to displace inwards, making the first and second pivot parts 12413, 12433 escape from the two pivot parts 14141 of the base 14 rapidly.

The adjusting part 1245 according to the present embodiment includes a recess 12451 and a sliding block 12452. The sliding block 12452 is disposed in the recess 12451. When the lock member 1244 moves downwards, the lock member 1244 pushes the first and second pivot members 1241, 1243 sideward for making the first and second pivot parts 12413, 12433 against the two pivot parts 14141 of the base 14, respectively. In order to make the first and second pivot parts 12413, 12433 against the two pivot parts 14141 of the base 14 continuously, the user can push the sliding block 12452 to make it slide out of the recess 12451 and to the sliding groove 1233 of the second pivot shaft 1231. Then, the adjusting part 1245 can wedge on the second pivot shaft 1231 for preventing the lock member 1244 from moving upward and thus keeping the first and second pivot parts 12413, 12433 against the two pivot parts 14141 of the base 14 continuously. To relieve the above situation, the user only needs to slide the sliding block 12452 into the recess 12451 of the adjusting part 1245 for relieving the situation in which the adjusting part 1245 is wedged on the second pivot shaft 1231. Then the lock member 1244 can move upwards and hence making the first and second pivot parts 12413, 12433 escape from the two pivot parts 14141 of the base 14.

To sum up, the disclosure relates to a standable electronic device, which has the supporting member on the electronic device body so that no extra supporting frame is required for the electronic device to stand on the surface of object. Once a spreading angle is produced between the electronic device body and the supporting member, the electronic device can stand on the surface of object. Thereby, the portability and convenience can be enhanced effectively. In addition, the electronic device body is connected to the base via the supporting member. The base includes computer peripheral devices. Accordingly, the user needs not to carry the computer peripheral devices but the electronic device, making the electronic device more portable and convenient.

Accordingly, the disclosure conforms to the legal requirements owing to its novelty, nonobviousness, and utility. However, the foregoing description is only embodiments of the disclosure, not used to limit the scope and range of the disclosure. Those equivalent changes or modifications made according to the shape, structure, feature, or spirit described in the claims of the disclosure are included in the appended claims of the disclosure.

The invention claimed is:

1. A standable electronic device, comprising:
an electronic device body, having a first surface and a second surface, and said first surface having a display region;
a supporting member, having a first end and a second end, and said first end disposed on said second surface; and
a base, for disposing said supporting member; where said second end pivots on said first end and moves away from said second surface for resting the bottom of said electronic device body against said base and standing on a surface of an object;
a locking mechanism disposed on said base, and said second end of said supporting member having a second pivot shaft wedged in said locking mechanism, said electronic device body pivots on said second pivot shaft, said locking mechanism comprises:
a first pivot member, embedded in said base;
a second pivot member, embedded in said base, said second pivot member disposed symmetrically with said first pivot member, and both ends of said second pivot shaft connected pivotally with said first pivot member and said second pivot member, respectively; and
a lock member, embedded in said base, and located between said first pivot member and said second pivot member;
where said lock member is wedged in said first pivot member and said second pivot member, said first pivot member and said second pivot member are connected pivotally at both ends of said second pivot shaft, said lock member releases said first pivot member and said second pivot member, and said first pivot member and said second pivot member escape from both ends of said second pivot shaft.

2. The standable electronic device of claim 1, wherein said first end has a first pivot shaft with both ends disposed on said second surface for said second end of said supporting member to pivot on said first pivot shaft.

3. The standable electronic device of claim 2, wherein said second surface of said electronic device body further has a recess with positioning members on both sides, respectively, both ends of said first pivot shaft of said supporting member are disposed pivotally at said two positioning members, and said supporting member is accommodated in said recess.

4. The standable electronic device of claim 1, wherein said first pivot member includes a first recess and a first pivot part, said second pivot member includes a second recess and a second pivot part, said first recess and said first pivot part are disposed symmetrically to said second recess and said second pivot part, said lock member includes two fasteners disposed in said first recess and said second recess, respectively, and said first pivot part and said second pivot part are connected pivotally with both ends of said second pivot shaft, respectively.

5. The standable electronic device of claim 4, wherein said locking mechanism further comprises an elastic body connected between said first pivot member and said second pivot member.

6. The standable electronic device of claim 4, wherein said lock member further has an adjusting part, said base further has a groove, and said adjusting part is located in said groove.

7. The standable electronic device of claim 1, wherein said base further includes at least a computer peripheral device, and said computer peripheral device and said electronic device body transmit signals via a transmission module.

8. The standable electronic device of claim 7, wherein said transmission module comprises: a first wireless transmission device, disposed in said base, and connected electrically to said computer peripheral device; and a second wireless transmission device, disposed in said electronic device body, and said electronic device body and said computer peripheral device transmit signals via said first wireless transmission device and said second wireless transmission device.

9. The standable electronic device of claim 7, wherein said computer peripheral device includes an input interface, an output device, a storage device, a CD/DVD player, a CD/DVD burner, or an expansion battery.

10. The standable electronic device of claim 9, wherein said input interface is a keyboard, touch pad, or handwriting pad.

11. The standable electronic device of claim 9, wherein said output device is a playing device.

12. A standable electronic device, comprising:
an electronic device body, having a first surface and a second surface, and said first surface having a display region;
a supporting member, having a first end and a second end, and said first end disposed on said second surface; and
a base, for disposing said supporting member; where said second end pivots on said first end and moves away from said second surface for resting the bottom of said electronic device body against said base and standing on a surface of an object;
wherein said second end of said supporting member has a second pivot shaft, said base has a pivot member, both ends of said pivot member has two pivot parts, said second pivot shaft is disposed at said two pivot parts, and said electronic device body pivots on said second pivot shaft, said second pivot shaft of said supporting member further includes:
a sliding groove; and
a locking mechanism, disposed in said sliding groove, and connected pivotally with said two pivot parts.

13. The standable electronic device of claim 12, wherein said locking mechanism comprises:
a first pivot member, disposed in said sliding groove;
a second pivot member, disposed in said sliding groove; and
a lock member, disposed in said sliding groove, and located between said first pivot member and said second pivot member;
where said lock member presses said first pivot member and said second pivot member, said first pivot member and said second pivot member are connected pivotally at said two pivot parts of said base, said lock member releases said first pivot member and said second pivot member, and said first pivot member and said second pivot member escapes from said two pivot parts of said base.

14. The standable electronic device of claim 13, wherein said first pivot member further has a first pivot part, said second pivot member further has a second pivot part, and said first pivot part and said second pivot part are connected pivotally at said two pivot parts of said base.

15. The standable electronic device of claim 13, wherein said first pivot member and said second pivot member further include a first elastic body and a second elastic body, respectively, and said first elastic body is disposed at said first pivot part and said second elastic body is disposed at said second pivot part.

16. The standable electronic device of claim 13, wherein said second pivot shaft further has an opening, said lock member further include an adjusting part, and said adjusting part passes through and is disposed in said opening.

17. The standable electronic device of claim 16, wherein said adjusting part further comprises: a recess; and a sliding block, disposed in said recess, sliding in said recess, and sliding to said sliding groove of said second pivot shaft.

18. The standable electronic device of claim 12, wherein said base further includes at least a computer peripheral device, and said computer peripheral device and said electronic device body transmit signals via a transmission module.

19. The standable electronic device of claim 18, wherein said transmission module comprises: a first wireless transmission device, disposed in said base, and connected electrically to said computer peripheral device; and a second wireless transmission device, disposed in said electronic device body, and said electronic device body and said computer peripheral device transmit signals via said first wireless transmission device and said second wireless transmission device.

20. The standable electronic device of claim 12, wherein said first end has a first pivot shaft with both ends disposed on said second surface for said second end of said supporting member to pivot on said first pivot shaft.

21. The standable electronic device of claim 20, wherein said second surface of said electronic device body further has a recess with positioning members on both sides, respectively, both ends of said first pivot shaft of said supporting member are disposed pivotally at said two positioning members, and said supporting member is accommodated in said recess.

22. The standable electronic device of claim 12, further comprising a locking mechanism disposed on said base, and said second end of said supporting member wedged in said locking mechanism.

* * * * *